Feb. 8, 1955     G. T. HARRIS     2,701,724
COLLET CHUCK
Filed Nov. 3, 1953
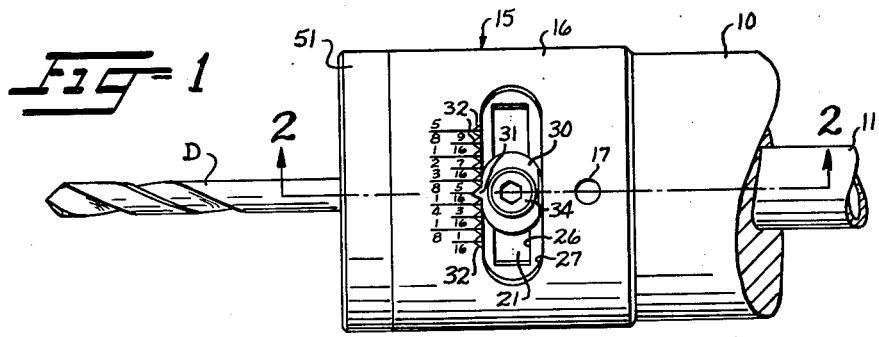
Fig-1
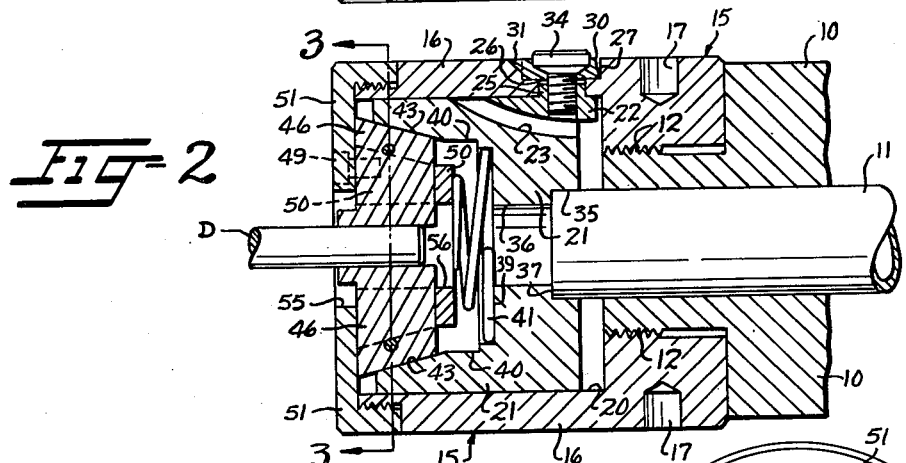
Fig-2
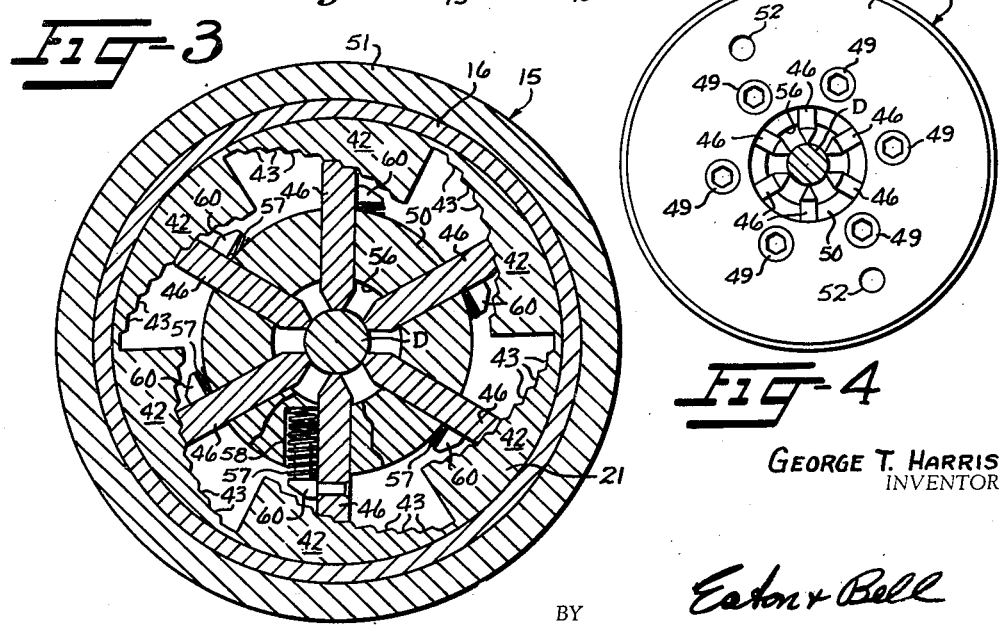
Fig-3
Fig-4
GEORGE T. HARRIS,
INVENTOR.
BY Eaton & Bell
ATTORNEYS

United States Patent Office

2,701,724
Patented Feb. 8, 1955

2,701,724

COLLET CHUCK

George T. Harris, Greensboro, N. C.

Application November 3, 1953, Serial No. 390,059

7 Claims. (Cl. 279—71)

This invention relates to collet chucks and more especially to an adjustable chuck to be used in connection with turret lathes, screw machines and the like.

Heretofore, the chucks used in connection with turret lathes and screw machines have been made to grip a particular size drill or other tool. This made it necessary to provide a separate collet chuck for each size drill and changing these chucks each time a different diameter drill is used has been a time consuming and expensive operation.

The primary object of this improved collet chuck is to provide a single chuck for holding tools such as drills and the like of varying diameter which obviates the necessity of providing a separate chuck for each size drill used.

It is another object of this invention to provide a chuck which is easy to manufacture and, at the same time, is effective in operation and which will assure that the tools placed therein will be perfectly alined with and in the accurate center of the shaft driving the improved collet chuck.

Another object of this invention is to provide an adjustable chuck which will have a positive grip on the drill shank or other tool placed therein and may be quickly and easily locked in gripping position.

Some of the objects of the invention having been stated, other objects will appear as the description proceeds, when taken in connection with the accompanying drawings, in which—

Figure 1 is a plan view of the improved collet chuck showing the same mounted on a lathe shaft or the like;

Figure 2 is a longitudinal vertical sectional view taken substantially along the line 2—2 in Figure 1;

Figure 3 is an enlarged transverse vertical sectional view taken substantially along the line 3—3 in Figure 2;

Figure 4 is a front elevation of the collet chuck looking from the left-hand side of Figure 1.

Referring more specifically to the drawings, the numeral 10 indicates a hollow driven shaft of a lathe, not shown, and has a push tube or draw bar 11 mounted for longitudinal sliding movement therein. The draw bar 11 is of the usual type associated with most lathes or screw machines, not shown, and may be moved to the left or the right relative to the lathe shaft 10 or may be locked in any position by conventional means associated with such machines. The draw bar 11 may be spring loaded if desired, so as to make the collet chuck self-gripping with a predetermined load.

The lathe shaft 10 is provided with a reduced threaded portion 12 onto which the improved collet chuck broadly designated at 15 is threadably secured. The collet chuck 15 comprises a tubular housing 16 having diametrically opposed drilled holes 17 therein which may be used as sockets for a spanner wrench, not shown, to tighten the housing 16 on the shaft 10.

The housing 16 has a bore 20 therein in which a longitudinally movable jaw closing and opening piston 21 is slidably mounted. The piston 21 is restricted as to rotational movement and is guided during its longitudinal sliding movement by a key 22 slidably engaging a keyway in the jaw operating piston 21. The key 22 has a reduced portion 25 which extends into an arcuate slot 26 in the wall of the housing 16. The arcuate slot 26 communicates with an enlarged portion or indicator guiding slot 27.

The slot 27 is provided to accommodate an oval-shaped indicator element 30 provided with a pointer portion 31 which is adapted to engage and fit into any one of a plurality of triangularly shaped register notches 32 which are cut in and spaced along the outer periphery of the housing 16 adjacent the slot 27. The notches 32 are marked with suitable indices or graduations and as illustrated they are individually marked with fractional parts of an inch corresponding with a plurality of tapered steps in the piston 21, to be later described. The key 22 is removably connected to and spaced from the lower surface of the indicator element 30 by a screw 34 which slidably penetrates the indicator element 30 and is threadably embedded in the key 22. The indicator element 30 fits loosely within the slot 27 and the edge thereof opposite the point 31 is preferably tapered to permit the indicator element 30 to tilt so that the point 31 may ride over the notches 32 upon the screw 34 being loosened.

The jaw operating piston 21 may be rotated relative to the housing 16 by loosening the screw 34 sufficiently to permit the indicator element 30 to be lifted high enough out of the slot 26 or tilted so that the point 31 will become disengaged from the registered notch 32 and then rotation of the indicator element 30 relative to the housing 16 will cause the jaw operating piston 21 to be rotated therewith. When the point 31 of the indicator element 30 is directly above the registered notch 32 which corresponds to the diameter of the drill or tool to be used in the chuck, the indicator element 30 may be lowered back into the slot 27 and in order to lock the piston 21 against rotation, relative to the housing 16, the screw 34 should be tightened so that the key 22 will be pulled up to and engage the face of the enlarged bore 20 and the reduced portion 25 of the key 22 will extend into the slot 26.

The jaw operating piston 21 is provided with a bore 35 and a reduced bore 36 the junctures of which form a shoulder 37 for reception of the draw bar 11, for purposes to be later described. The forward end of the piston 21 has a circular cavity 40 and a spring seat 39 therein in which a compression spring 41 is disposed. The cavity 40 is provided with a plurality of circularly spaced tapered and stepped wedge-shaped projections 42. Each of the projections 42 is tapered relative to the axis of the chuck in a generated curve formed by a plurality of notches or steps 43 which are each spaced a progressively greater distance from the axis of the chuck (Figure 3). The steps 43 shown in the drawings are shown as being 1/32 of an inch high to correspond to the graduations of the notches 32. The projections 42 also taper axially inwardly from front to rear as will be observed in Figure 2. The tapering notches or steps 43 in the piston 21 are adapted to be engaged by the outer tapered stepped edges of a plurality of chuck jaws 46.

The chuck jaws 46 are mounted radially of and have sliding movement in a chuck jaw guide block 50 the front end of which in Figures 2 and 4 is fixedly secured as by screws 49 to a closure disk or cover 51. The cover 51 is threadably mounted on the outer threaded end of the housing 16 and is provided with drilled openings 52 in the face thereof which are adapted to receive the lugs of a spanner wrench or the like to tighten the closure plate 51 on the threaded portion of the housing 16. The closure plate 51 is also provided with an opening 55 therein which is provided to allow the insertion of the shank of a drill or tool D into the chuck jaws 46.

The chuck jaws 46 extend through the chuck jaw guide block 50 and into a bore 56 therein. The inner ends of the jaws 46 are preferably tapered to form a relatively narrow gripping surface for gripping a work piece such as a drill or the like. The outer ends of the chuck jaws 46 are normally urged into engagement with the tapering notches 43 on the respective projections 42 of the jaw operating piston 21 by a plurality of compression springs 57, each of which has one end fitted in a bore 58 in the guide block 50 and the other end of which surrounds a stirrup 60 fixedly mounted in each of the chuck jaws 46.

The compression spring 41 (Figure 2), previously described, at one end engages the cavity 40 in the piston 21 and the other end thereof engages the chuck guide block 50 to thus normally urge the jaw operating piston 21 rearwardly or from left to right in Figure 2, thereby allowing the chuck jaws 46 to be moved outwardly by the compression springs 57 to their outermost positions depending upon which of the stepped tapering notches 43 they engage. It is thus seen that the jaw operating piston 21 is moved to its rearmost position by releasing the pressure on the draw bar 11 and allowing the compression spring 41 to push the piston 21 from right to left in Figure 3.

By referring to Figure 3 it will be observed that the chuck jaws 46 may be moved inwardly or outwardly relative to their axis by rotation of the piston 21 relative to the housing 16. This is accomplished by movement of the indicator element 30. Since the housing 16 and the chuck guide jaw block 50 are fixed relative to each other, movement of the jaw operating piston 21 in a counter-clockwise direction in Figure 3 will cause the chuck jaws 46 to move inwardly toward their axis, against the compression springs 57, as the outer ends thereof are moved up the step-like tapered portions 43 of the piston 21.

Since the steps 43 are 1/32 of an inch high, each time the piston 21 is rotated one step in a counter-clockwise direction in Figure 3 the chuck jaws 46 will be moved 1/32 of an inch closer to the center each time they engage the next step 43 of the piston 21. As the piston 21 is moved in a clockwise direction in Figure 3 relative to the housing 16, the outer ends of the chuck jaws 46 will be moved down the step-like tapered portions 43 of the piston 21 and the compression springs 57 will cause the chuck jaws to slide through the chuck jaw guide block 50, or outwardly away from the axis of the chuck.

In operation, after the indicator element 30 and the pointer 31 have been moved to the desired registered notch 32, which will cause the jaw operating piston 21 to be rotated to the desired position as previously described, and assuming that the draw bar 11 is in its normally inoperative position or to the right of that position shown in Figure 2, a drill or tool D, of the same diameter as the number on the registered notch in which the pointer 31 of the indicating element 30 is positioned, is placed in the opening 55 of the closure plate 51. With the jaw operating piston 21 moved to the right in Figure 2 by the compression spring 41, the chuck jaw 46 will be spaced slightly away from the outer periphery of the drill D.

As the draw bar 11 is moved from left to right in Figure 2 into engagement with the shoulder 37 to move the piston 21 to the position shown in Figure 2, the tapered portions 43 of the jaw operating piston 21 will cause the chuck jaws 46 to be moved inwardly radially through the chuck jaw guide block 50 and against the compression springs 57 to thus tightly grip the drill D and as the draw bar 11 is locked in its innermost position the drill D will then be locked into position by the chuck jaws 46.

In the drawings and specification there has been set forth a preferred embodiment of the invention and, although specific terms are employed, they are used in a generic and descriptive sense only and not for purposes of limitation, the scope of the invention being defined in the claims.

I claim:

1. A collet chuck for a driven shaft having a draw bar slidably mounted therein comprising an open ended tubular clutch housing secured to one end of said driven shaft, a piston mounted for axial and rotational movement within said housing, said piston having an axially extending generally conical cavity therein, a plurality of wedge-shaped projections formed on the walls of said cavity, said projections being tapered axially of said chuck, each of said projections having a plurality of steps formed in the inner wall thereof and extending in a generated curved line relative to the chuck axis, a plurality of circularly-shaped radially movable jaws having tool gripping inner ends, said jaws having axially tapered outer ends engageable with the steps on said wedge-shaped projections, means for partially rotating said piston for varying the position of said jaws relative to the chuck axis by varying the point of contact of the outer ends of said jaws with the wedge-shaped projections, and said piston being movable axially by said draw bar for moving said jaws inwardly and outwardly relative to said chuck axis in accordance with the axial taper of said wedge-shaped projections.

2. A collet chuck for a driven shaft having a draw bar slidably mounted therein comprising a tubular clutch housing secured at one end to one end of said driven shaft and open at its other end, a piston mounted for axial and rotational movement within said housing, said piston having an axially extending generally conical cavity therein, a plurality of wedge-shaped projections formed on the walls of said cavity, said projections being tapered axially of said chuck, each of said projections having a plurality of steps formed in the inner wall thereof and extending in a generated curved line relative to the chuck axis, a plurality of circularly-shaped radially movable jaws having tool gripping inner ends, said jaws having axially tapered outer ends engageable with the steps on said wedge-shaped projections, closure means for partially closing said open end of said chuck and retaining the piston and jaws therewithin, a block fixed on said closure means and having a plurality of circularly-arranged radial slots therein penetrated by said jaws, said block also having a tool receiving axial bore therein, means for partially rotating said piston for varying the position of said jaws relative to the chuck axis by varying the point of contact of the outer ends of said jaws with the wedge-shaped projections, said piston being movable axially by said draw bar for moving said jaws inwardly and outwardly relative to said chuck axis in accordance with the axial taper of said wedge-shaped projections.

3. A collet chuck for a driven shaft having a draw bar slidably mounted therein comprising a tubular clutch housing secured at one end to one end of said driven shaft and open at its other end, a piston mounted for axial and rotational movement within said housing, said piston having an axially extending generally conical cavity therein, a plurality of wedge-shaped projections formed on the walls of said cavity, said projections being tapered axially of said chuck, each of said projections having a plurality of steps formed in the inner wall thereof and extending in a generated curved line relative to the chuck axis, a plurality of circularly-shaped radially movable jaws having tool gripping inner ends, said jaws having axially tapered outer ends engageable with the steps on said wedge-shaped projections, closure means for partially closing said open end of said chuck and retaining the piston and jaws therewithin, a block fixed on said closure means and having a plurality of circularly-arranged radial slots therein penetrated by said jaws, said block also having a tool receiving axial bore therein, means for partially rotating said piston for varying the position of said jaws relative to the chuck axis by varying the point of contact of the outer ends of said jaws with the wedge-shaped projections, said piston being movable axially by said draw bar for moving said jaws inwardly relative to said chuck axis, and spring means urging said piston away from said block and cooperating with said draw bar for moving said jaws outwardly relative to said chuck axis in accordance with the axial taper of said wedge-shaped projections.

4. A collet chuck for a driven shaft having a draw bar slidably mounted therein comprising a tubular clutch housing secured at one end to one end of said driven shaft and open at its other end, said housing having a slot therein, a piston mounted for axial and rotational movement within said housing, said piston having a keyway therein, a key positioned in said keyway and projecting into said slot, an axially extending generally conical cavity therein, a plurality of wedge-shaped projections formed on the walls of said cavity, said projections being tapered axially of said chuck, each of said projections having a plurality of steps formed in the inner wall thereof and extending in a generated curved line relative to the chuck axis, a plurality of circularly-spaced radially movable jaws having tool gripping inner ends, said jaws having axially tapered outer ends engageable with the steps on said wedge-shaped projections, closure means for partially closing said open end of said chuck and retaining the piston and jaws therewithin, a block fixed on said closure means and having a plurality of circularly-arranged radial slots therein penetrated by said jaws, said block also having a tool receiving axial bore therein, means for partially rotating said piston for varying the position of said jaws relative to the chuck axis by varying the point of contact of the outer ends of said jaws with the wedge-shaped projections, said piston being movable axially by said draw bar for moving said jaws inwardly and outwardly relative to said chuck axis in accordance with the axial taper of said wedge-shaped projections, said housing having a plurality of graduated notches therein adjacent the edge of said slot, locking means connected to said key and releasably engageable with said notches for locking said key and said piston against rotational movement, and means for releasing said locking means from engagement with said notches to permit said key and said piston to be partially rotated to a desired position.

5. An improved chuck comprising a housing having a longitudinally extending cavity normally opened at one end thereof, a closure member for the opened end of said cavity, a piston mounted for axial movement in said cavity, said piston having a keyway therein, a circularly adjustable key carried by the housing and slidably fitting in said piston keyway, the end of said piston adjacent the closure member having a second cavity therein, the wall defining the second cavity having a plurality of circularly arranged inwardly projecting portions thereon whose inner surfaces are each provided with outwardly and radially tapered stepped surfaces thereon of collectively generally arcuate configurations and wherein the stepped surfaces of each of the projections are disposed at progressively increasing radii relative to the axis of said second cavity, a jaw guide carried by said closure member and projecting into the second cavity, a plurality of circularly arranged radially movable jaws for each of said inwardly projecting portions of said cavity, spring means normally urging each of the jaws radially outwardly into engagement with the corresponding stepped surfaces on said inwardly projecting portions of the wall of the second cavity, the outer peripheral surfaces of the radially movable jaws being tapered in conformity with the taper of the stepped surfaces of the inner wall of said second cavity whereby adjustment of said key with corresponding circular adjustment of said piston causes radial movement to be imparted to said jaws in accordance with the stepped surfaces engaged by the outer peripheral surfaces of said jaws for varying the displacement between the proximal ends of said jaws and for clamping a tool therebetween.

6. In a structure according to claim 5, a compression spring engaging the inner end of said jaw guide and the bottom of the corresponding second cavity, and means for moving the piston toward the jaw guide whereby the tapered proximal surfaces of the jaws and the stepped surfaces of the second cavity will cause the jaws to move radially inwardly from the position to which they had previously been adjusted.

7. In a collect chuck for a shaft having an axially adjustable draw bar therein, said collect chuck including a housing; the combination of an axially movable piston mounted in said housing and adapted to be connected to said draw bar, means for adjusting said piston in a circular manner relative to said housing, said last-named means also serving to prevent relative rotational movement, but to permit relative axial movement, between the housing and the piston, a closure for the end of said housing remote from said draw bar, a plurality of circularly faced radially movable jaws carried by the closure member, said piston having a cavity in the end thereof adjacent the closure member whose inner periphery is provided with a plurality of circularly arranged notches therein there being one of said notches for each of said jaws, the inner surfaces of each of said notches being circularly stepped in steps of progressively increasing radii, each of said steps being tapered outwardly and radially toward the closure member, the outer peripheral surfaces of each of the jaws being tapered in accordance with the taper of said steps, resilient means normally urging the piston axially inwardly relative to said jaws whereby relative rotational movement between the piston and the jaws will vary the normal displacement between the proximal ends of said jaws and whereby axial movement may be imparted to said piston by the draw bar toward the jaws for moving the jaws radially inwardly for clamping a tool therebetween.

References Cited in the file of this patent

UNITED STATES PATENTS

| Number | Name | Date |
|---|---|---|
| 211,911 | Johnston | Feb. 4, 1879 |
| 599,968 | Laws | Mar. 1, 1898 |
| 638,601 | Seren | Dec. 5, 1899 |
| 952,084 | Stebbins et al. | Mar. 15, 1910 |
| 1,076,710 | Schaltis | Oct. 28, 1913 |
| 1,263,270 | Millholland | Apr. 16, 1918 |
| 1,497,483 | Callender et al. | June 10, 1924 |
| 1,499,727 | Hanson | July 1, 1924 |